United States Patent [19]

Thurston et al.

[11] Patent Number: 5,386,716
[45] Date of Patent: Feb. 7, 1995

[54] FLUIDIC PROXIMITY SENSOR AND RELATED PROCESS

[75] Inventors: John F. Thurston, Mesa; Ernest W. Cassaday, Apache Junction; George W. Carrie, Scottsdale, all of Ariz.

[73] Assignee: AlliedSignal Inc., Morris Township, Morris County, N.J.

[21] Appl. No.: 187,427

[22] Filed: Jan. 26, 1994

Related U.S. Application Data

[63] Continuation-in-part of Ser. No. 144,936, Oct. 28, 1993, abandoned.

[51] Int. Cl.⁶ .............................................. G01B 13/12
[52] U.S. Cl. ........................................................ 73/37.5
[58] Field of Search ............................ 73/37.5, 37.6, 37

[56] References Cited

U.S. PATENT DOCUMENTS

| 2,982,124 | 5/1961 | Knobel | 73/37.7 |
| 3,194,055 | 7/1965 | Knobel | 73/37.5 |
| 3,610,024 | 10/1971 | Honjo et al. | 73/37.5 |
| 4,070,902 | 1/1978 | Knobel | 73/37.5 |
| 4,607,960 | 8/1986 | Wulff | 374/7 |
| 4,724,701 | 2/1988 | Mon | 73/37.5 |

FOREIGN PATENT DOCUMENTS 1004130 9/1965 United Kingdom ................. 73/37.6

*Primary Examiner*—Thomas P. Noland
*Assistant Examiner*—Joseph W. Roskos
*Attorney, Agent, or Firm*—Robert A. Walsh

[57] ABSTRACT

Fluidic proximity sensing apparatus for use with a linear induction motor car. The apparatus is comprised of a floating sensor head in operative combination with a dual flapper valve which forms two air gaps. A change in the proximity of the sensor head to a track surface is converted to a dimensional variation in the air gaps, which in turn is sensed by fluidic oscillators.

10 Claims, 3 Drawing Sheets

FIG. 3
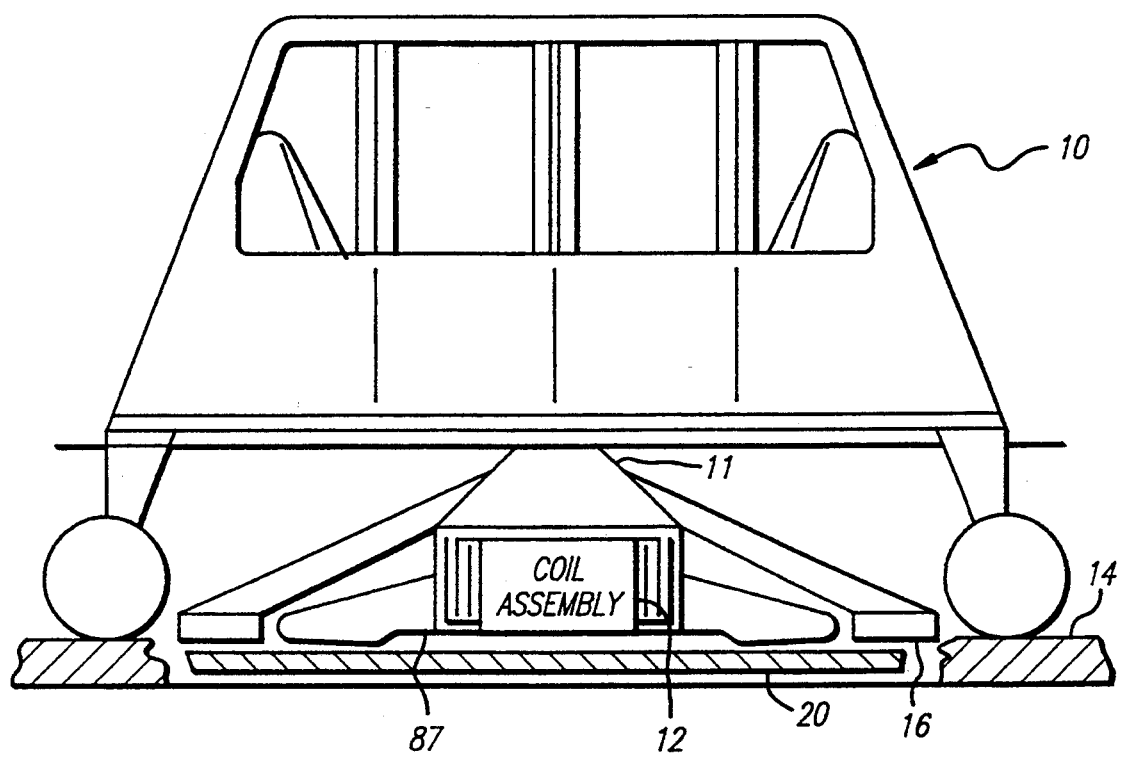
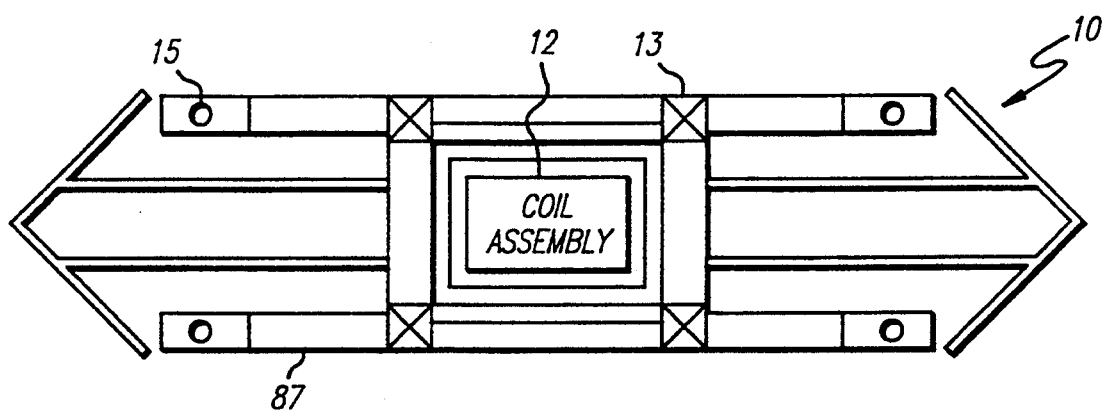
FIG. 4

FLUIDIC PROXIMITY SENSOR AND RELATED PROCESS

This application is a continuation-in-part of Ser. No. 08/144,936 filed Oct. 28, 1993 and now abandoned.

TECHNICAL FIELD

The present invention relates in general to sensors and more specifically to proximity sensors. Still more specifically, the invention relates to a fluidic (aka 'flueric') proximity sensing process and to apparatus adapted for use therewith.

BACKGROUND OF THE INVENTION

New concepts in public transportation include the use of linear induction motors (LIMS) for propelling individual cars of a train. LIMS can be used for propelling the cars and/or for levirating them.

A basic explanation of the operation of an LIM is provided in the detailed description below. Efficient propulsion by an LIM requires that associated propulsion coils be maintained in very close proximity to a reaction track without touching it. Other complications arise from track undulations and the need to elevate the propulsion coils away from the track to avoid damage from debris and track surface anomalies. All of this must be accomplished with a system which is immune from electromagnetic interference otherwise resulting from operation of the propulsion coils.

An object of the invention is to provide a pneumatic and fluidic sensing system which will meet the proximity sensing requirements of LIM cars while avoiding electromagnetic interference. Other objects and advantages of the invention may become apparent from the following descrition, which includes the appended claims and accompanying drawings.

SUMMARY OF THE INVENTION

The invention is, in one aspect, a process for producing two series of pressure pulsations that are collectively indicative of the proximity of a sensor head to a surface. The invention comprises the steps of directing pressurized air through the sensor head and toward the surface to maintain a nominal clearance between the surface and the sensor head; moving an object incident to a variation in the nominal clearance; changing dimensions of two air gaps in substantially equal and opposite directions incident to movement of the object; increasing air pressure in a first air passage and decreasing air pressure in a second air passage in response to change in the dimensions; producing a first series of pressure pulsations in response to increased air pressure in the first air passage; and producing a second series of pressure pulsations in response to decreased air pressure in the second air passage.

In a second aspect the invention is a proximity sensing apparatus adapted for use with the above-described process and comprising in combination: a sensor head defining a longitudinal axis thereof; the sensor head having an air inlet and being adapted to discharge air in a direction substantially parallel to the axis; a two-nozzle flapper valve forming first and second air gaps; the valve being operatively associated with the sensor head whereby movement of the sensor head relative to the valve and along the axis is accompanied by dimensional variation in the air gaps; and fluidic oscillator means in fluid communication with the valve for outputting first and second series of pressure pulsations collectively indicative of the dimensional variation.

BRIEF DESCRIPTION OF THE DRAWINGS

FIG. 3 is a schematic illustration of a LIM car and associated track with which the invention can be beneficially employed.

FIG. 4 is a bottom schematic view of the LIM car illustrated in FIG. 3.

DESCRIPTION OF THE PREFERRED EMBODIMENT

Figure 1:
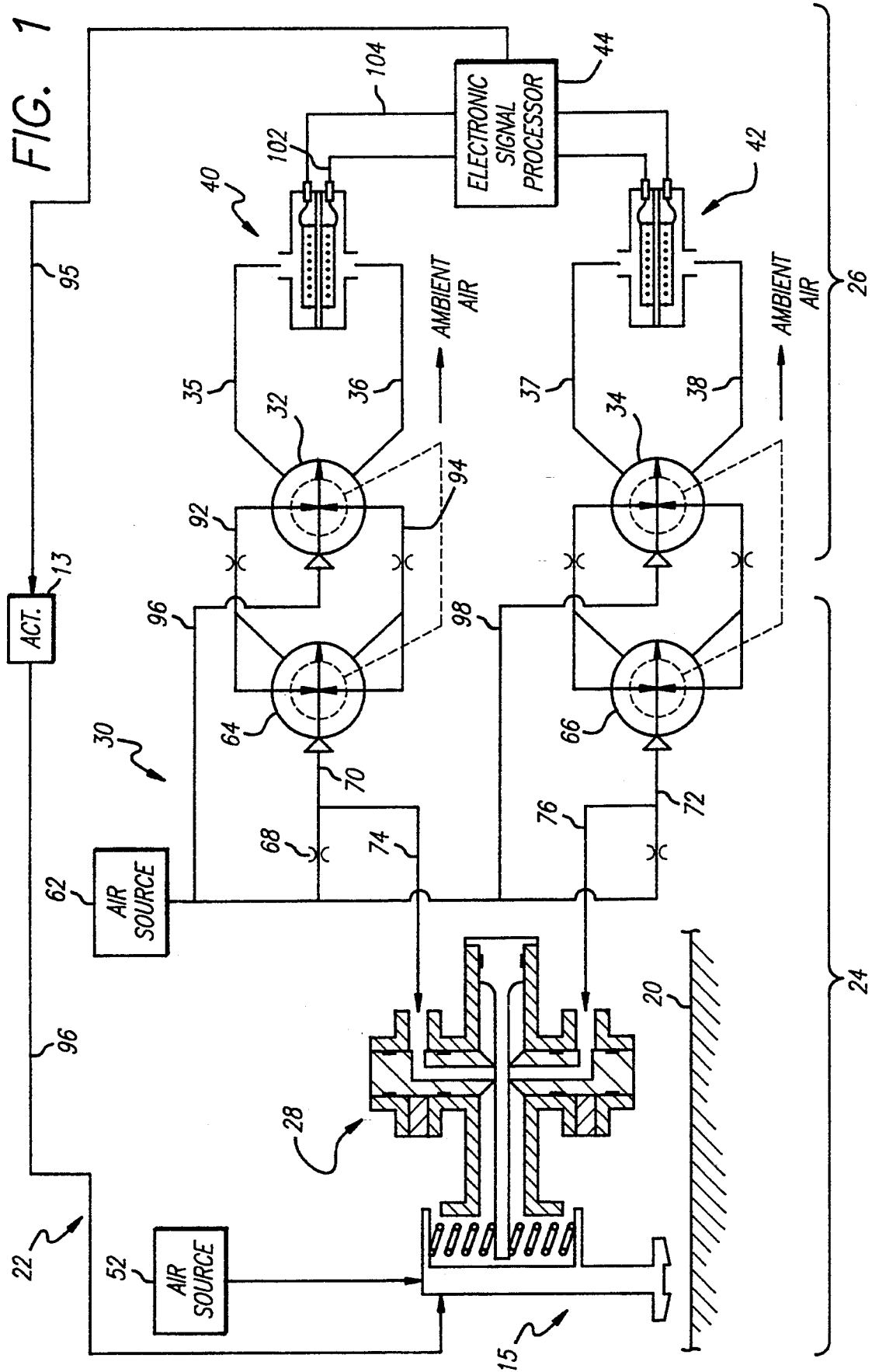
FIG. 1 is a schematic drawing of an apparatus adapted for use with the invention.

FIGS. 3 and 4 illustrate an LIM car 10 having a downward projecting pylon 11. The pylon 11 supports power and height control components including a propulsion coils assembly 12, height control actuators (as at 13) and proximity sensor heads (as at 15). In operation, the car is propelled along a roll surface 14 by supplying alternating current to the coil assembly 12, with the current being phase-displaced between successive coils. Sequential pulsing of the coils produces large eddy currents in a paramagnetic-metal reaction track 16 above which the coil assembly 12 is suspended. Fields associated with the eddy currents repulsively react with the fields produced by the coils so that the sequential pulsing propels the car 10 along the roll surface 14 in one of the two indicated directions. Reversing the pulsing sequence reverses the direction of propulsive force, and thus reverses the direction in which the car travels. For reasons explained above, the clearance between the top surface 20 of the reaction track 16 and the bottom of the coil assembly 12 must be maintained during normal operation within a range of about 0.5334 cm to about 0.6350 cm. This is accomplished by a proximity sensing and control system employing four identical sensing and control subsystems (as at 22 in FIG. 1), one for each of the sensor heads 15.

Figure 2:
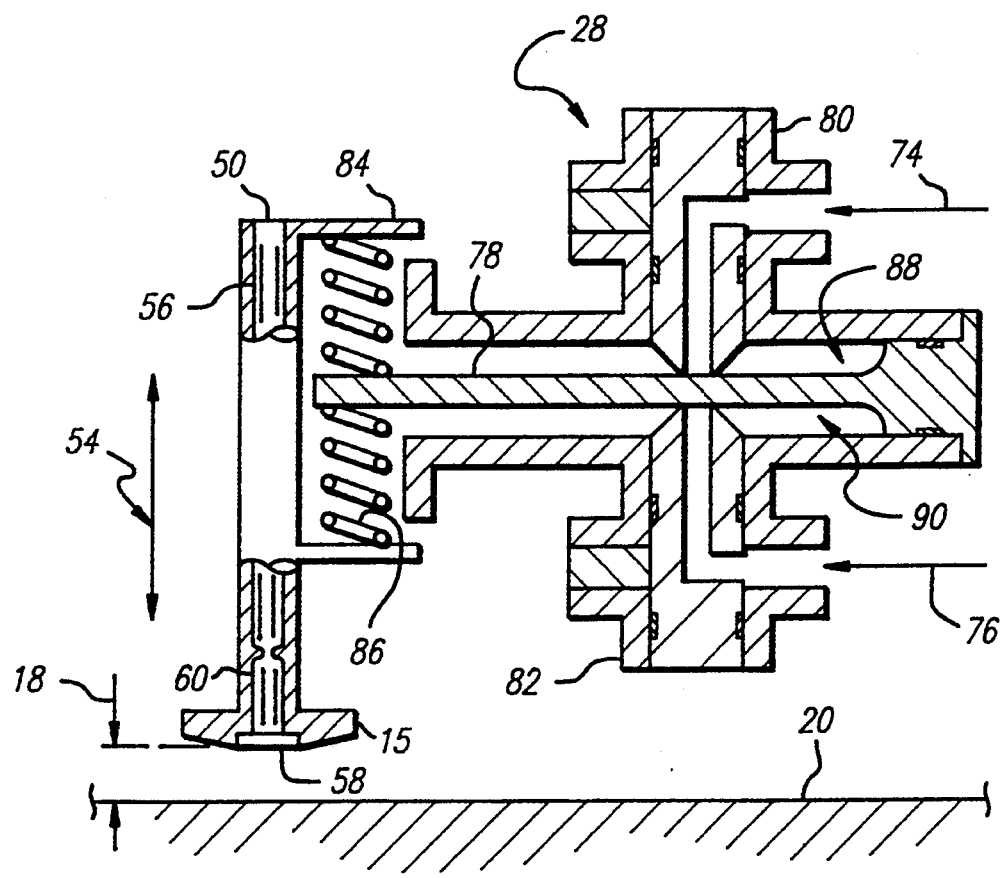
FIG. 2 is an enlargement of the area indicated by dashed line in FIG. 1, shown in cross-section.

Referring now to FIGS. 1 and 2, each sensor head 15 is a component of a subsystem 22 comprised of a sensory portion 24 and a control portion 26. The sensory portion 24 is comprised of a sensor head 15, an operatively associated pneumatic differential amplifier 28, and a fluidic oscillator circuit 30. The control portion 26 of each subsystem is comprised of fluidic proportional amplifiers 32, 34, transmission channels 35–38, ceramic piezoelectric transducer assemblies 40, 42, a microprocessor 44, a height control actuator 13, and suitable interfaces (not shown).

Each sensor head 15 is connected at an inlet 50 to a pressure-regulated source 52 of pressurized air. The sensor head 15 is generally cylindrical in shape, thus defining a longitudinal axis 54 along which it is movable relative to the pneumatic amplifier 28. An axially extending air channel 56 extends from the inlet 50 to an outlet 58, and is provided with a flow restrictor 60. Filtered air is supplied from the source 52 to the inlet 50 at a predetermined pressure, and flows through the restrictor 60 under choked-flow conditions. Air is discharged from the outlet 58 at a pressure which provides an air cushion with a pneumatic spring rate of about 402.36 lbs./cm. The nominal clearance 18 between the sensor head 15 and the surface 20 is 0.0254 cm.

Each oscillator circuit 30 is supplied with filtered, pressurized air from another source 62, which also supplies the air to the supply ports of the proportional amplifiers 32, 34 along channels 96, 98. In the illustrated embodiment, the circuit 30 is comprised of two pressure-controlled fluidic feedback oscillators 64, 66 which receive air from the source 62 through restrictors (as at 68). Air is tapped from the input channels 70, 72 of the oscillators and supplied under laminar flow conditions to input channels 74, 76 of the pneumatic differential amplifier 28.

As is better illustrated in FIG. 2, the amplifier 28 is provided in the form of a dual flapper valve comprised of a flapper 78 interposed between two nozzles 80, 82. The flapper 78 is coupled to the piston head 15 by non-conductive springs 84, 86. The nozzles 80, 82 are rigidly connected to a carriage structure 87 (FIG. 3) which carries the sensor heads 15 and the coil assembly 12. The carriage 87 is movable relative to the pylon 11 (FIG. 3), and the sensor heads 15 are movable relative to the carriage in axial directions 54. Accordingly, axial movement of the sensor head 15 moves the flapper 78 relative to the nozzles 80, 82, thus effecting dimensionally equal but directionally opposite changes in the normally equal air gaps 88, 90 formed between the nozzles and the flapper.

It will be recognized that a decrease in either of the air gaps 88, 90 is communicated as an increase in pressure along the respective channels 70-76 leading to the inputs of the oscillators 64, 66, while an increase in either gap is communicated as a decrease in pressure along the same respective channels. Therefore, the pressure input to the oscillators 64, 66 is proportional to the proximity of the sensor head 15 to the surface 20. The output of each oscillator (as at 64) is a series of pressure pulsations communicated along respective channels 92, 94 to the control ports of a respective proportional amplifier 32. The pressure pulsations are produced at a frequency which is proportional to the pressure in the oscillator input channel 70. The output of each oscillator is fluidically amplified as indicated, and is transmitted along channels (as at 35 and 36) to a piezoelectric diaphragm assembly (as at 40) located remotely from the field produced by the coil assembly 12. The pressure oscillations are converted by the assembly 40 to electrical sine wave voltage signals. The voltage signals are amplified and converted to square wave pulses by an electronic signal processor (ESP) 44. For each sensor head 15, the ESP 44 receives a pair of frequency signals 102, 104, the difference of which indicates the clearance 18 while providing common-mode cancellation of acoustic, mechanical, and electrical noise. In accord with the indicated clearance 18, the ESP 44 communicates control signals 95 to the actuator 13 which, via the carriage 87, controls the position of the sensor head 15 (as indicated by the arrow 96) to maintain the desired clearance 18 or to lift the sensor heads and coil assembly 12 to prevent damage from debris or excessive track undulation.

The foregoing portion of the description is intended to serve a pedagogical purpose and is not intended to restrict the invention such that its scope is limited by details which are merely ancillary to the teaching contained herein.

What is claimed is:

1. Proximity sensing apparatus, comprising in combination:

a sensor head having an air inlet and an air outlet;

pneumatic differential amplifier means for forming first and second air gaps; the amplifier means being operatively associated with the sensor head whereby movement of the sensor head relative to the amplifier means is accompanied by dimensional variation in the air gaps;

fluidic oscillator means in fluid communication with the amplifier means for outputting first and second fluidic pressure signals collectively indicative of the dimensional variation.

2. Apparatus as recited in claim 1 wherein the amplifier means comprises a dual flapper valve.

3. Apparatus as recited in claim 2 wherein the flapper valve comprises a flapper interposed between two nozzles; the flapper cooperating with the nozzles to form the air gaps.

4. Apparatus as recited in claim 3 further comprising spring means for biasing the flapper toward a position at which the air gaps are substantially equal.

5. Apparatus as recited in claim 4 wherein the spring means is in interfacing relation with both the sensor head and the flapper.

6. Apparatus as recited in claim 4 further comprising transducer means for converting the fluidic pressure signals to electrical signals.

7. Apparatus as recited in claim 1 further comprising transducer means for converting the fluidic pressure signals to electrical signals.

8. Proximity sensing apparatus, comprising in combination:

a sensor head defining a longitudinal axis thereof; the sensor head having an air inlet and being adapted to discharge air in a direction substantially parallel to the axis;

a two-nozzle flapper valve forming first and second air gaps; the valve being operatively associated with the sensor head whereby movement of the sensor head relative to the valve and along the axis is accompanied by dimensional variation in the air gaps;

fluidic oscillator means in fluid communication with the valve for outputting first and second series of pressure pulsations collectively indicative of the dimensional variation.

9. Apparatus as recited in claim 8 further comprising transducer means for converting the pressure pulsations to first and second electrical signals.

10. A process for producing two series of pressure pulsations that are collectively indicative of the proximity of a sensor head to a surface, comprising the steps of:

directing pressurized air through the sensor head and toward the surface to produce an air bearing which tends to maintain a nominal clearance between the surface and the sensor head;

moving an object incident to a variation in the nominal clearance;

changing dimensions of two air gaps in substantially equal and opposite directions incident to movement of the object;

increasing air pressure in a first air passage and decreasing air pressure in a second air passage in response to change in the dimensions;

producing a first series of pressure pulsations in response to increased air pressure in the first air passage; and producing a second series of pressure pulsations in response to decreased air pressure in the second air passage.

* * * * *